United States Patent [19]
Mizoguchi

[11] Patent Number: 5,846,036
[45] Date of Patent: Dec. 8, 1998

[54] PROTECTIVE COVER

[75] Inventor: Haruki Mizoguchi, Ikoma, Japan

[73] Assignee: MST Corporation, Ikoma, Japan

[21] Appl. No.: 927,489

[22] Filed: Sep. 11, 1997

[30] Foreign Application Priority Data

Sep. 12, 1996 [JP] Japan ................................ 8-242013

[51] Int. Cl.⁶ ............................................. B23B 47/00
[52] U.S. Cl. ........................ 409/134; 279/125; 279/157; 408/241 G; 408/710
[58] Field of Search ............................ 409/134, 234; 279/125, 157; 408/241 R, 241 G, 710

[56] References Cited

U.S. PATENT DOCUMENTS 3,837,383  9/1974  Ko ............................ 408/241 G
4,200,417  4/1980  Hager et al. .................. 408/241 G

*Primary Examiner*—Daniel W. Howell
*Attorney, Agent, or Firm*—Burns, Doane, Swecker & Mathis, LLP

[57] ABSTRACT

A protective cover comprising a tool covering portion and a pressure contact tube portion. The pressure contact tube portion is formed on its periphery with a multiplicity of resilient pieces. When the pressure contact tube portion is fitted over a front end portion of a tool holder, the resilient pieces come into pressure contact with a cylindrical case and a chucking nut, both of the tool holder, whereby the protective cover is securely attached to the tool holder.

10 Claims, 12 Drawing Sheets

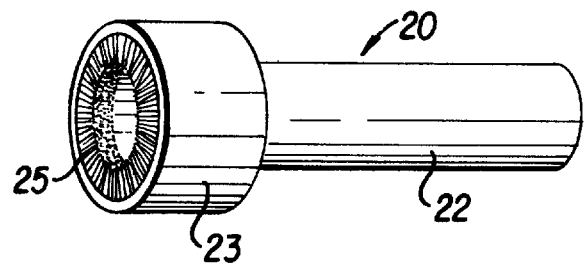
FIG. 4
FIG. 5
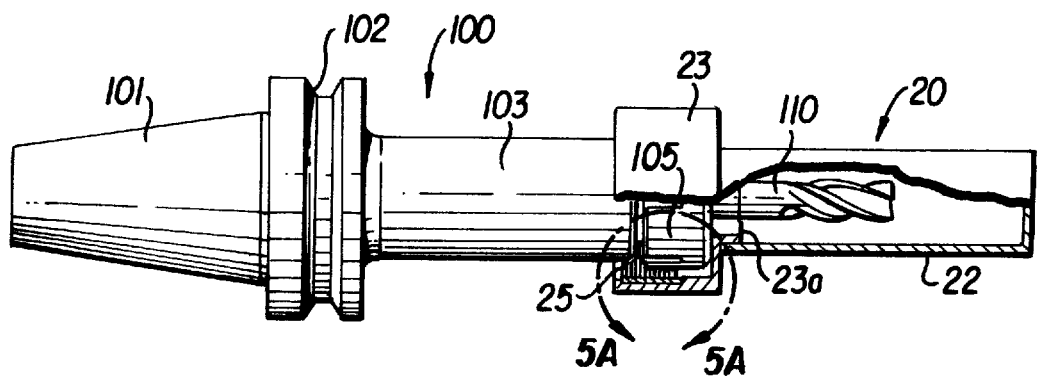
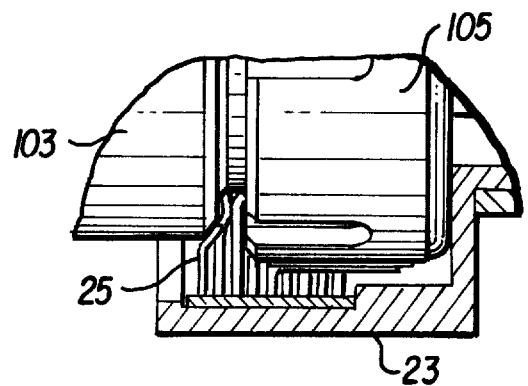
FIG. 5A

F I G. 14a
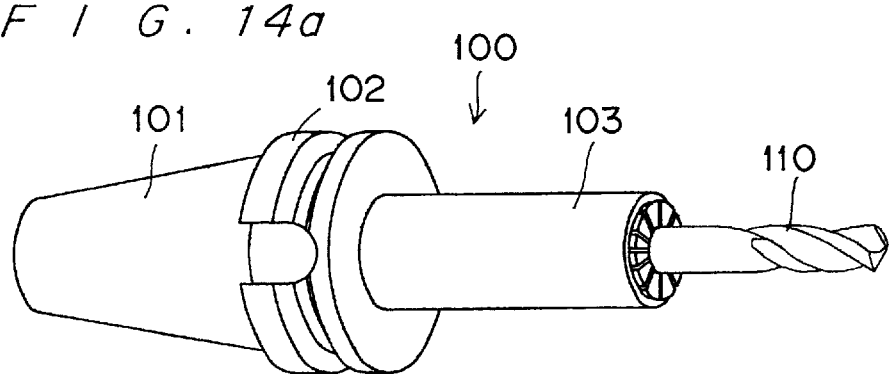
F I G. 14b
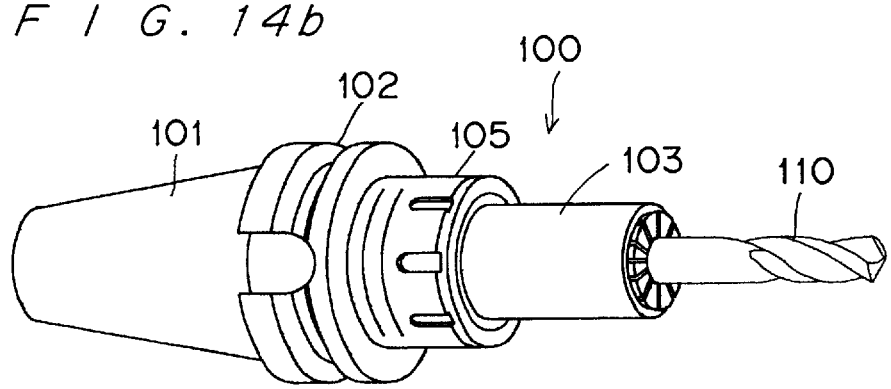

FIG. 16
PRIOR ART
FIG. 16a
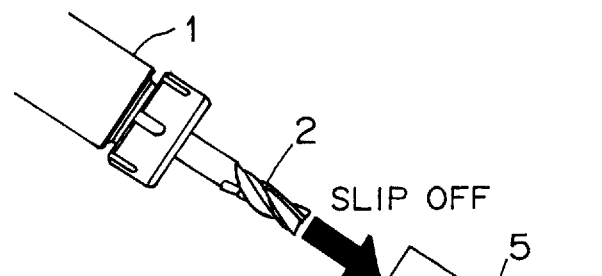
FIG. 16b
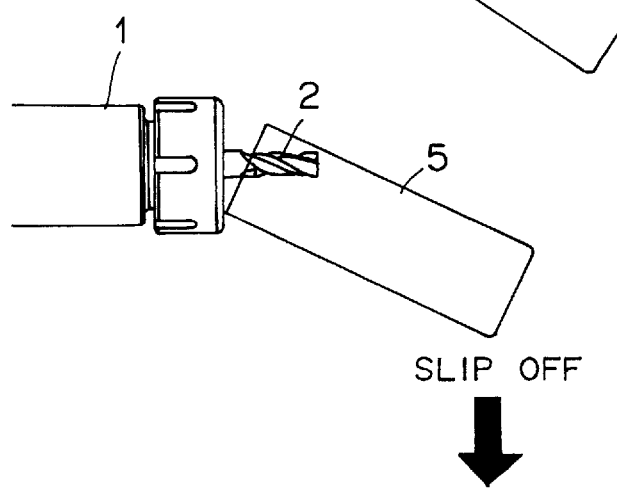
FIG. 16c
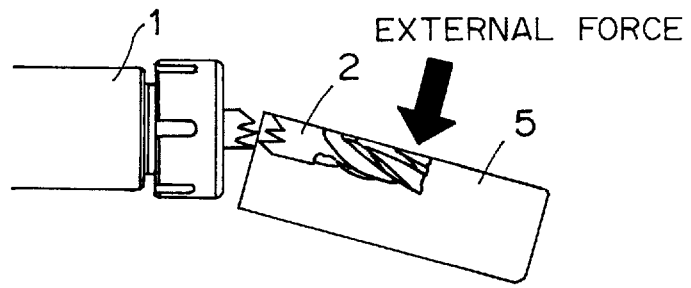

5,846,036

PROTECTIVE COVER

BACKGROUND OF THE INVENTION

1. Field of the Invention

The present invention relates to a protective cover and, more particularly, to a protective cover for covering and protecting a tool mounted to a front portion of a tool holder.

2. Description of Related Art

Generally, tools for use at a machining center or the like are stored on a storage shelf in such a condition that the tools are each mounted to a holder. However, tool holders, each with a tool mounted thereto, which are stored on a tool storage shelf are such that all the tools are so positioned as to confront the operator. This involves considerable danger. Moreover, in order to secure largest possible storage space, individual tool holders are stored within a much limited space, with adjacent tool holders held close to each other. This poses a problem that when handling such tool holder for take-in/take-out purposes, even a bit of carelessness may possibly result in the operator getting hurt by touching the tool or may cause a trouble such that the tool hits other holder and is thereby broken or otherwise damaged.

Hitherto, therefore, as FIG. 15 shows, it has been usual practice that a tool 2 mounted to the front portion of a tool holder 1 is covered with a tube-form cover 5 or, as a substitute for the cover 5, a case as attached to the tool 2 at the time of purchase thereof. However, with the cover 5 merely placed over the tool 2 in such a way, the trouble is that when the cover 5 is slightly touched, or when the front portion of the tool holder 1 is slightly tilted during operation or transport as shown in FIG. 16a, the cover 5 will slip off. Further, as FIG. 16b shows, the tool 2, of such a short length as shown, cannot well support the cover 5 which in turn loses its balance with the tool 2 and thus easily slips off. Again, as FIG. 16c shows, the tool 2, of such a slender configuration as shown, is of low rigidity and is, therefore, much liable to breakage or other damage due to external force acting directly upon the tool 2.

SUMMARY OF THE INVENTION

Therefore, it is an object of the present invention to provide a protective cover which can protect a tool mounted to a tool holder, affords safety of tool handling, does not easily slip off, and is easy to mount and remove.

In order to accomplish the above object, the protective cover in accordance with the present invention comprises a cover body encompassing a tool, and a pressure contact member disposed at one open end portion of the cover body or adjacent thereto for resilient pressure contact with an outer periphery of a chuck portion, rather than a manipulator handle portion, of a tool holder. The protective cover is held on the outer periphery of the tool holder to protect the tool mounted to the tool holder, thus insuring the safety of the operator. There is no external force from the protective cover which acts directly upon the tool and, therefore, even where the tool is of slender and low rigidity construction, the tool is not liable to breakage or other damage. Further, since the protective cover is resiliently fitted on the tool holder, the cover is prevented from easy slip off and can be readily mounted and removed by one hand.

For the pressure contact member, various forms may be employed including plural resilient pieces, tongues, a brush, and a locking element adapted for resilient engagement with the tool holder.

Where the tool is thick and sufficiently rigid, the protective cover of the present invention may comprise a cover body encompassing a cutting part of the tool, and a pressure contact member disposed at one open end portion of the cover body or adjacent thereto for resilient pressure contact with the tool. As long as the tool is highly rigid, the tool is not liable to breakage or other damage when the protective cover is fitted directly over the tool. Further, the protective cover can be of reduced size construction.

In the protective cover of the present invention, the cover body is preferably transparent, because this permits the tool to be accurately identified.

BRIEF DESCRIPTION OF THE DRAWINGS

This and other objects and features of the present invention will become apparent from the following description with reference to the accompanying drawings, in which:

FIG. 4 is a perspective view showing a protective cover representing a second embodiment of the present invention;

FIGS. 5 and 5A are half sectional views of the FIG. 4 protective cover shown as mounted to the tool holder;

FIGS. 14a and 14b are perspective views showing other tool holders respectively;

FIGS. 16a, 16b, and 16c are explanatory views showing drawbacks of the conventional protective cover.

DETAILED DESCRIPTION OF THE PREFERRED EMBODIMENTS

Embodiments of the protective cover in accordance with the present invention will be described with reference to the accompanying drawings.

Figure 1:
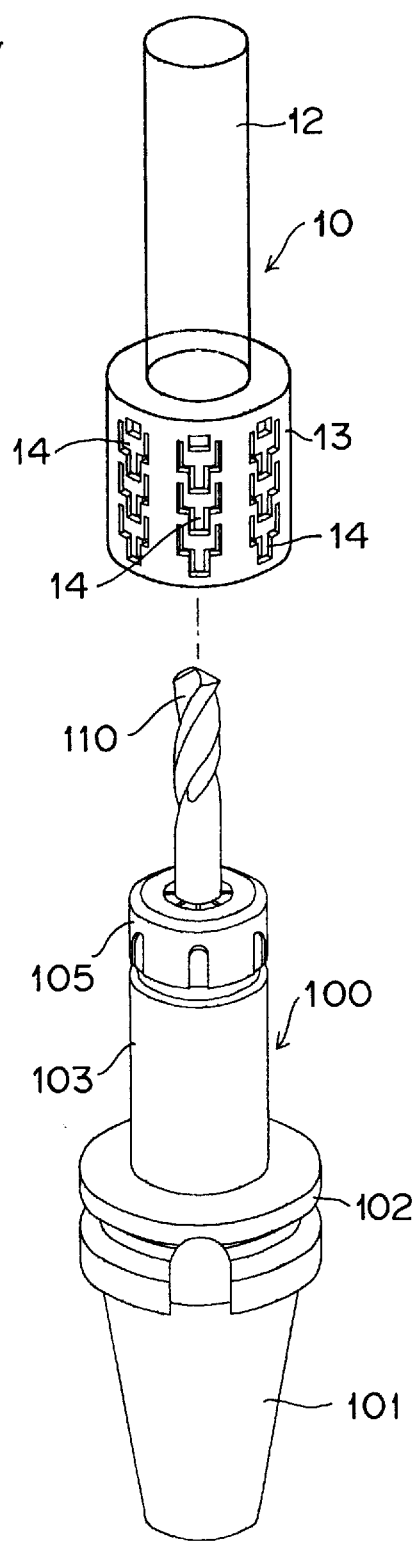
FIG. 1 is a perspective view showing a protective cover representing a first embodiment of the present invention, and a tool holder.
Figure 2:
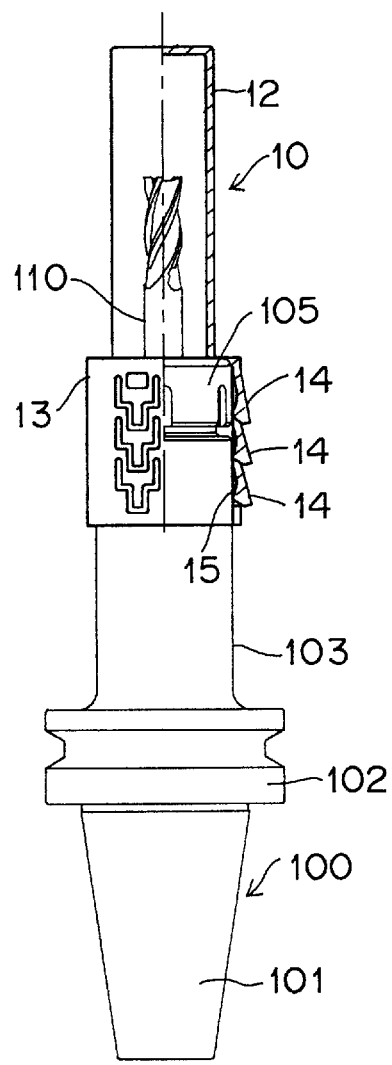
FIG. 2 is a half sectional view of the FIG. 1 protective cover shown as mounted to the tool holder.
Figure 3:
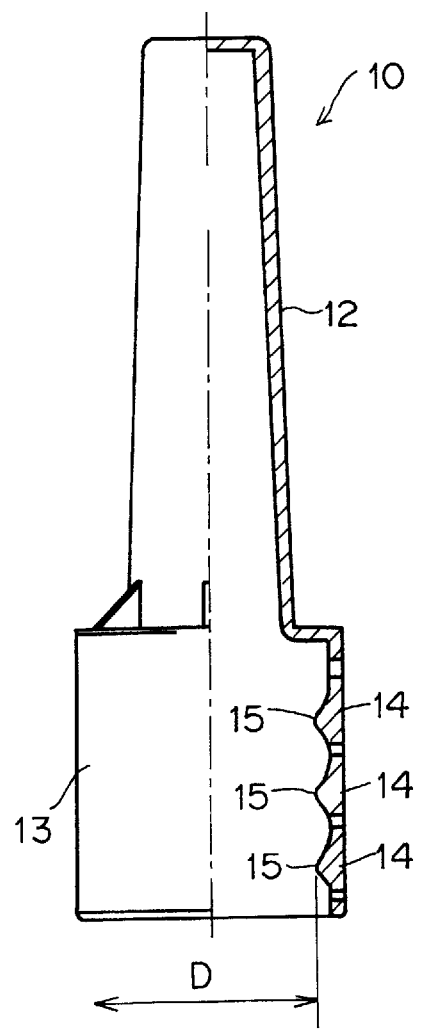
FIG. 3 is a half sectional view of the protective cover shown in FIG. 1.
Figure 6:
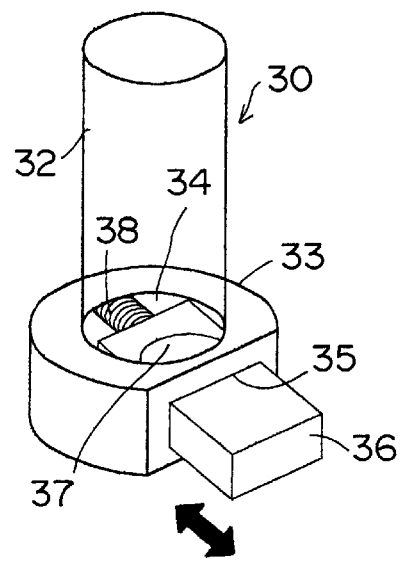
FIG. 6 is a perspective view showing a protective cover representing a third embodiment of the present invention.
Figure 7:
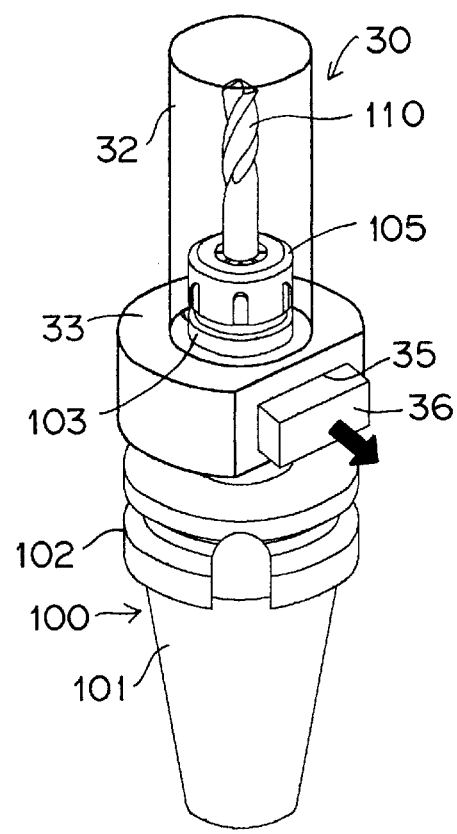
FIG. 7 is a perspective view of the FIG. 6 protective cover shown as mounted to the tool holder.
Figure 8:
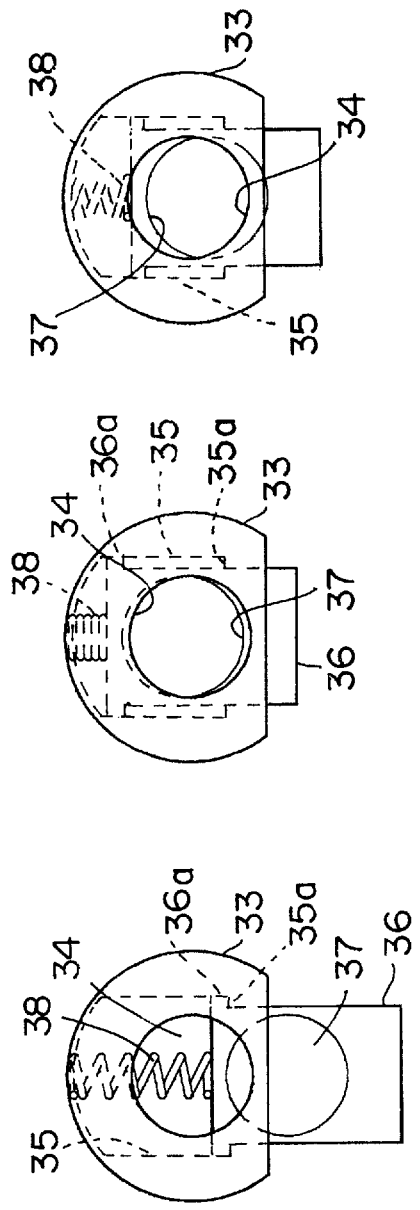
FIGS. 8a, 8b and 8c are explanatory views illustrating the operation of a locking piece in the protective cover shown in FIG. 6.

First Embodiment (see FIGS. 1 to 3)

A protective cover designated generally by reference numeral 10 comprises a tool cover portion 12 and a pressure contact tube portion 13 for pressure contact with a tool holder 100 which are integrally formed of a transparent resin material. The pressure contact tube portion 13 is formed on its periphery with a multiplicity of resilient pieces 14, each of the resilient pieces 14 having a projection 15 on its interior (see FIG. 3).

The tool holder 100 includes a tapered shank portion 101 for mounting the tool holder 100 to a main spindle of a machine tool not shown, a manipulator handle portion 102, a cylindrical case 103, and a chucking nut 105. A tool 110 is held in position as clamped by the chucking nut 105.

As FIG. 3 illustrates, the projection 15 of each resilient piece 14 has an inner diameter D set slightly smaller than the outer diameter of the cylindrical case 103 and of the chucking nut 105. Therefore, the protective cover 10 is such that by fitting the pressure contact tube portion 13 over the front end portion of the tool holder 100 (see FIG. 2) the resilient pieces 14 are caused to come into resilient pressure contact with the outer periphery of the cylindrical case 103 and the chucking nut 105. By virtue of the pressure contact force of the resilient pieces 14, the protective cover 10 can be fitted on the tool holder 100 free of easy slip-off possibility. Cover mount/remove operation can be readily performed by one hand. Furthermore, through the contact of end face of the pressure contact tube portion 13 with the end face of the chucking nut 105, the protective cover 10 is securely held on the tool holder 100.

It may be conceivable to design the protective cover to be of a larger size to cause the protective cover 10 to go into resilient pressure contact with the handle portion 102. In that case, however, when the a protective cover is mounted to the handle portion 102, the space occupied by the protective cover becomes larger in radial directions and, as a result, a tool storage arrangement of a narrow storing pitch would be unable to accommodate such protective covers. Usually, however, the case 103 and the nut 105 are smaller in outer diameter than the handle portion 102, so that as long as the protective cover 10 is to be fitted over the outer periphery of the case 103 and the nut 105, the protective cover 10 can be accommodated in the tool storage arrangement without trouble.

Second Embodiment (see FIGS. 4 and 5)

A protective cover 20 comprises a tool cover portion 22 and a pressure contact tube portion 23 for pressure contact with the tool holder 100. The tool cover portion 22 is formed of a transparent resin material, and the pressure contact tube portion 23 is formed of an opaque material. The two portions are integrally joined by bringing an open end portion of the tool cover portion 22 into engagement with a ring-shaped projection 23a of the pressure contact tube portion 23. The pressure contact tube portion 23 is implanted on its inner periphery with a brush 25. The brush 25 is resiliently brought into pressure contact with the chucking nut 105 of the tool holder 100 or the front end portion of the cylindrical case 103, whereby the protective cover 20 is mounted to the tool holder 100.

The tool cover portion 22 is exchangeable for one corresponding to the length of the tool 110. The brush 25 need not be provided over the entire inner periphery of the pressure contact tube portion 23, but may be provided in a tooth brush-like fashion at angular intervals of 90°.

Third Embodiment (see FIGS. 6 to 8a, 8b and 8c)

A protective cover 30 comprises a tool cover portion 32 formed of a transparent resin material, and a pressure contact tube portion 33 formed of an opaque material. The pressure contact tube portion 33 has a hole 34 and a slot portion 35 open at one side, with a locking element 36 sidably fitted in the slot portion 35. The locking element 36 is formed with a hole 37 having a diameter identical with that of the hole 34 and slightly larger than the outer diameter of the cylindrical case 103 of the tool holder 100. Innermost of the slot portion 35 is housed a coil spring 38 by which the locking element 36 is normally biased outward. The locking element 36 has projections 36a engageable with stepped portions 35a of the slot portion 35 such that, through the engagement of the projections 36a with the stepped portions 35a, the locking element 36 is prevented from slipping off outward (see FIGS. 8a, 8b and 8c).

The locking element 36 normally projects outward under biasing force of the coil spring 38 (see FIG. 8a). When the locking element 36 is pushed inward, the hole 37 coincides substantially with the hole 34 (see FIG. 8b). In that condition, the protective cover 30 is fitted on the front end portion of the tool holder 100, so that the holes 34 and 37 are positioned on the outer periphery of the cylindrical case 103. Then, the force applied to the locking element 36 is released, whereupon the locking element 36 is forced back by the coil spring 38 to some degree so that the cylindrical case 103 is pressure-engaged by means of the holes 34 and 37 (see FIGS. 7 and 8c). To remove the protective cover 30, the locking element 36 is slightly forced in thereby to release the pressure engagement of the cylindrical case 103 by means of the holes 34 and 37, whereupon the protective cover 30 is ready to be removed from the tool holder 100 as it is.

Figure 9:
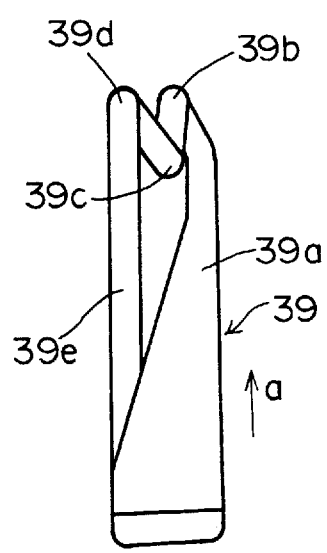
FIG. 9 is a side view showing a piano wire guide groove as one modified form of the protective cover shown in FIG. 6.

In this third embodiment, the slot portion 35 may be provided on a side wall surface thereof with a guide groove 39 as shown in FIG. 9, and the locking element 36 may include an engagement mechanism, not shown, fitted with a piano wire. This engagement mechanism itself is well known in the art such that when the locking element 36 is forced in the direction of arrow "a", the tip of the piano wire moves along an inclined groove portion 39a and in the direction of arrow "a" until it drops into a first recess 39b. Then, the forcing applied to the locking element 36 is released, whereupon the locking element 36 is pushed back by the coil spring 38 so that the tip of the piano wire engages a second recess 39c. In that condition, the holes 34 and 37 substantially coincide with each other to enable the protective cover 30 to be mounted to the tool holder 100. After the protective cover 30 is mounted to the tool holder 100, the locking element 36 is again forced in until the tip of the piano wire drops into a third recess 39d. Then, the forcing applied to the locking element 36 is released, whereupon the spring force of the coil spring 38 allows the cylindrical case 103 to be pressure engaged by the holes 34 and 37.

To remove the protective cover 30 from the tool holder 100, the locking element 36 should be pressed in once. Thereupon, the tip of the piano wire retreats to the third recess 39d and, in that condition, the protective cover 30 is pulled out from the tool holder 100. Then, the forcing applied to the locking element 36 is released, whereupon the tip of the piano wire moves along the inclined groove portion 39e in a direction opposite to the direction of arrow "a" until it returns to its initial position.

For this type of engagement mechanism, those of various forms and configurations are known in the art, any desired one of which may be employed as such.

Figure 10:
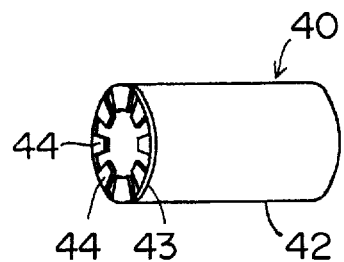
FIG. 10 is a perspective view illustrating a protective cover which represents a fourth embodiment of the present invention.
Figure 11:
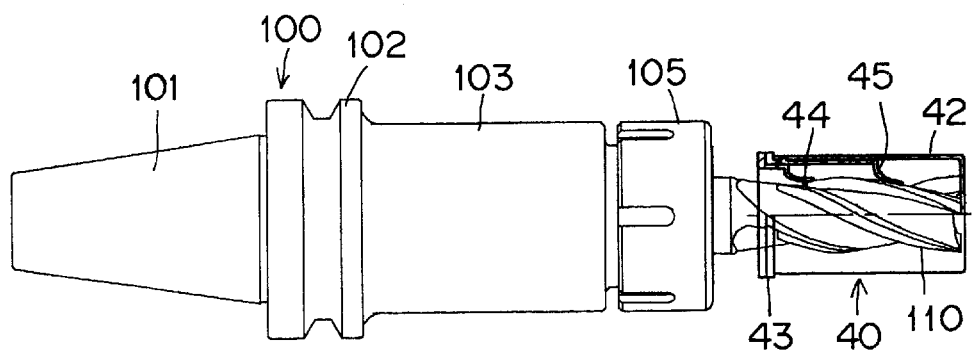
FIG. 11 is a half sectional view of the FIG. 10 protective cover shown as mounted to the tool holder.

Fourth Embodiment (see FIGS. 10 and 11)

In this embodiment, a protective cover 40 is designed to directly cover the tool 110. As in the fourth embodiment, as well as in the fifth embodiment to be described next, where the tool 110 is thick and has sufficient stiffness, use of the protective cover for directly covering the tool 110 involves no possibility of breaking or otherwise damaging the tool 110 and is rather desirable from the standpoint of size reduction of the protective cover itself.

Specifically, the protective cover 40 comprises a tool cover portion 42 formed of a transparent resin material, and a ring shaped pressure contact member 43 fixed to an opening of the tool cover portion 42, with resilient tongues 44, 45 formed in the interior of the pressure contact member 43. The protective cover 40 is such that mere placement of the cover over the tool 110 permits the tongues 44, 45 to come into pressure contact with the tool 110 so that the protective cover 40 can be fitted over the tool 110.

Figure 12:
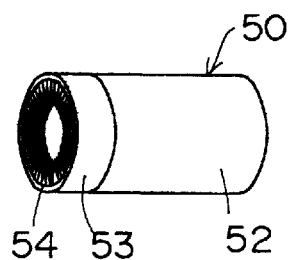
FIG. 12 is a perspective view showing a protective cover representing a fifth embodiment of the present invention.
Figure 13:
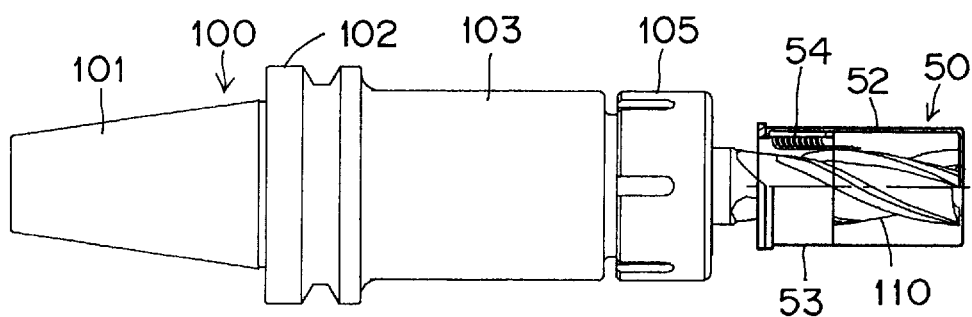
FIG. 13 is a half sectional view of the FIG. 12 protective cover shown as mounted to the tool holder.
Figure 15:
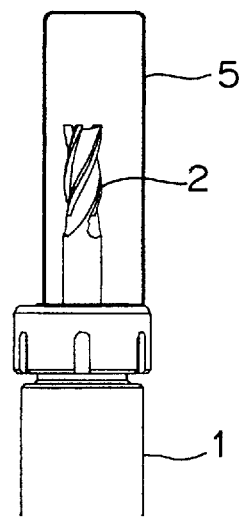
FIG. 15 is a front view showing a tool holder fitted with a conventional protective cover.

Fifth Embodiment (see FIGS. 12 and 13)

In this embodiment, a protective cover 50 comprises a tool cover portion 52 formed of a transparent resin material, and a pressure contact tube portion 53 fixed to an opening of the tool cover portion 52, with a multiplicity of brushes 54 implanted on the inner periphery of the pressure contact tube portion 53. The protective cover 50 is fitted on the tool 110 as the brushes 54 come into resilient pressure contact with the tool 110.

Other Embodiments

The protective cover of the present invention is not limited to the foregoing embodiments, but may be varied and/or modified in various ways within the scope and spirit of the invention.

In particular, the pressure contact member for resilient pressure contact with the case, nut, and/or the tool may take various other configurations and forms.

For example, the tongues 44, 45 used in the fourth embodiment may be used in such a way that the tongues 44, 45 are caused to go into pressure engagement with the cylindrical case 103 or the chucking nut 105 of the tool holder 100 as in the first embodiment.

In the fourth and fifth embodiments, for the tool cover portion 42 and 52, any suitable case available at the user's end (e.g., used photo-film case) may be utilized as such; and the pressure contact member 43 and pressure contact tube portion 53 may be separately made available to the user. The utilization of used photo-film cases is contributive toward material recycling.

The configuration of the tool holder is not limited to the one shown in FIG. 1, etc., but tool holders of various other configurations may be employed including, for example, those shown in FIGS. 14*a* and 14*b*, namely, one in which the cylindrical case 103 extends straight from the manipulator handle portion 103, and one in which the chucking nut 105 is provided at the base of the cylindrical case 103.

What is claimed is:

1. A protective cover for covering and protecting a tool mounted to a front portion of a tool holder, comprising:

a cover body encompassing the tool; and a pressure contact member disposed at one open end portion of the cover body or adjacent thereto for resilient pressure contact with an outer periphery of a chuck portion, rather than a manipulator handle portion, of the tool holder.

2. A protective cover as set forth in claim 1 wherein the cover body is transparent.

3. A protective cover as set forth in claim 1 wherein the pressure contact member includes a plurality of resilient pieces.

4. A protective cover as set forth in claim 1 wherein the pressure contact member includes a plurality of tongues.

5. A protective cover as set forth in claim 1 wherein the pressure contact member includes a brush.

6. A protective cover as set forth in claim 1 wherein the pressure contact member includes a locking element disposed for movement in a direction perpendicular to an axis of the tool holder, the locking element being biased by a spring member in one direction for resilient pressure contact with the tool holder.

7. A protective cover for covering and protecting a tool mounted to a front portion of a tool holder, comprising:

a cover body encompassing at least a cutting part of the tool; and a pressure contact member disposed at one open end portion of the cover body or adjacent thereto for resilient pressure contact with the tool.

8. A protective cover as set forth in claim 7 wherein the cover body is transparent.

9. A protective cover as set forth in claim 7 wherein the pressure contact member includes a plurality of tongues.

10. A protective cover as set forth in claim 7 wherein the pressure contact member includes a brush.

* * * * *